United States Patent [19]
Kaiser et al.

[11] Patent Number: 5,734,900
[45] Date of Patent: Mar. 31, 1998

[54] INFORMATION HANDLING SYSTEM INCLUDING EFFICIENT POWER ON INITIALIZATION

[75] Inventors: John Michael Kaiser; Warren Edward Maule, both of Cedar Park, Tex.

[73] Assignee: International Business Machines Corporation, Armonk, N.Y.

[21] Appl. No.: 537,174

[22] Filed: Sep. 29, 1995

[51] Int. Cl.$^6$ .................................................. G06F 9/06
[52] U.S. Cl. ............... 395/652; 395/651; 395/800.01
[58] Field of Search .................... 395/800, 651, 395/652

[56] References Cited

U.S. PATENT DOCUMENTS

| | | | |
|---|---|---|---|
| 4,491,914 | 1/1985 | Sujaku | 364/200 |
| 5,247,659 | 9/1993 | Curran et al. | 395/651 |
| 5,257,378 | 10/1993 | Sideserf et al. | 395/652 |
| 5,305,457 | 4/1994 | Takida et al. | 395/821 |
| 5,410,699 | 4/1995 | Bealkowski et al. | 395/652 |

FOREIGN PATENT DOCUMENTS 0364127  4/1990  European Pat. Off. .

OTHER PUBLICATIONS

"Logical IPL Selection Mechanism," *IBM Technical Disclosure Bulletin*, vol. 29, No. 2, pp. 491–493, Jul. 1986.
"Method to Read Bootstrap Record from Unknown Formatted Device," *IBM Technical Disclosure Bulletin*, vol. 30, No. 12, pp. 67–70, May 1988.

*Primary Examiner*—Alyssa H. Bowler
*Assistant Examiner*—Walter D. Davis
*Attorney, Agent, or Firm*—George E. Clark; Jenkens & Gilchrist; Anthony V. S. England

[57] ABSTRACT

An information handling system includes one or more processing units, a data management unit, connected to the processor data bus, to a memory system, and to a I/O bus, an address management unit, connected to the processor address bus, to the memory system, to an I/O bus, and to a system initialization storage device, storing an initialization routine and data, wherein system initialization includes, in response to an Initial Program Load Read command issued by a processor, the steps of returning initialization data to the processor if the IPL read is accepted (IPL data available) by a device attached to the processor bus; if no device attached to the processor bus responds with IPL data, passing the read IPL command to the I/O bus under control of the data management unit; if the read command is accepted by an I/O controller attached to the I/O bus, returning initialization data to the processor; if no I/O controller accepts the IPL read command, passing the read command to the system initialization storage device, under the control of the data management unit; and returning initialization data to the processor.

2 Claims, 8 Drawing Sheets

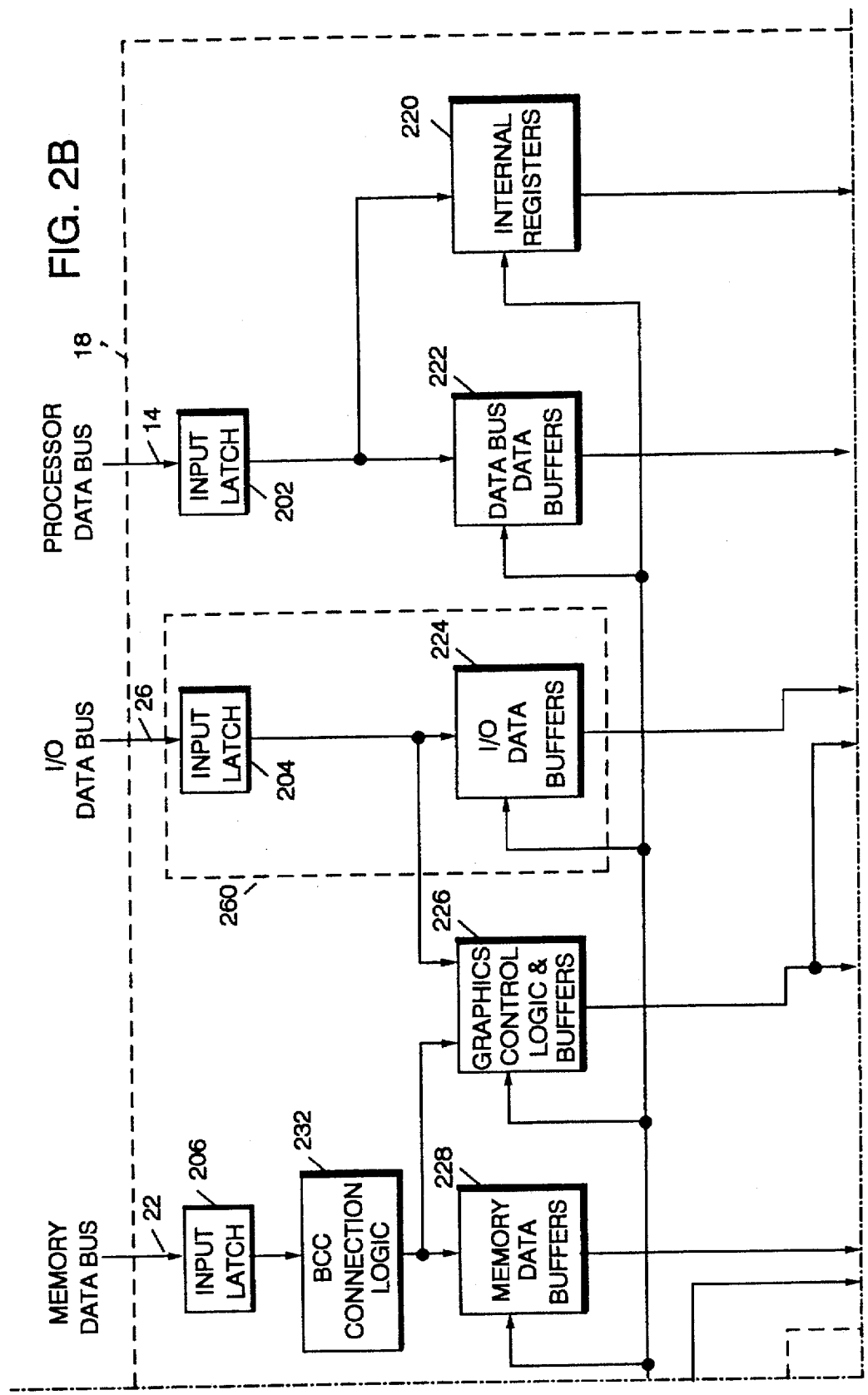

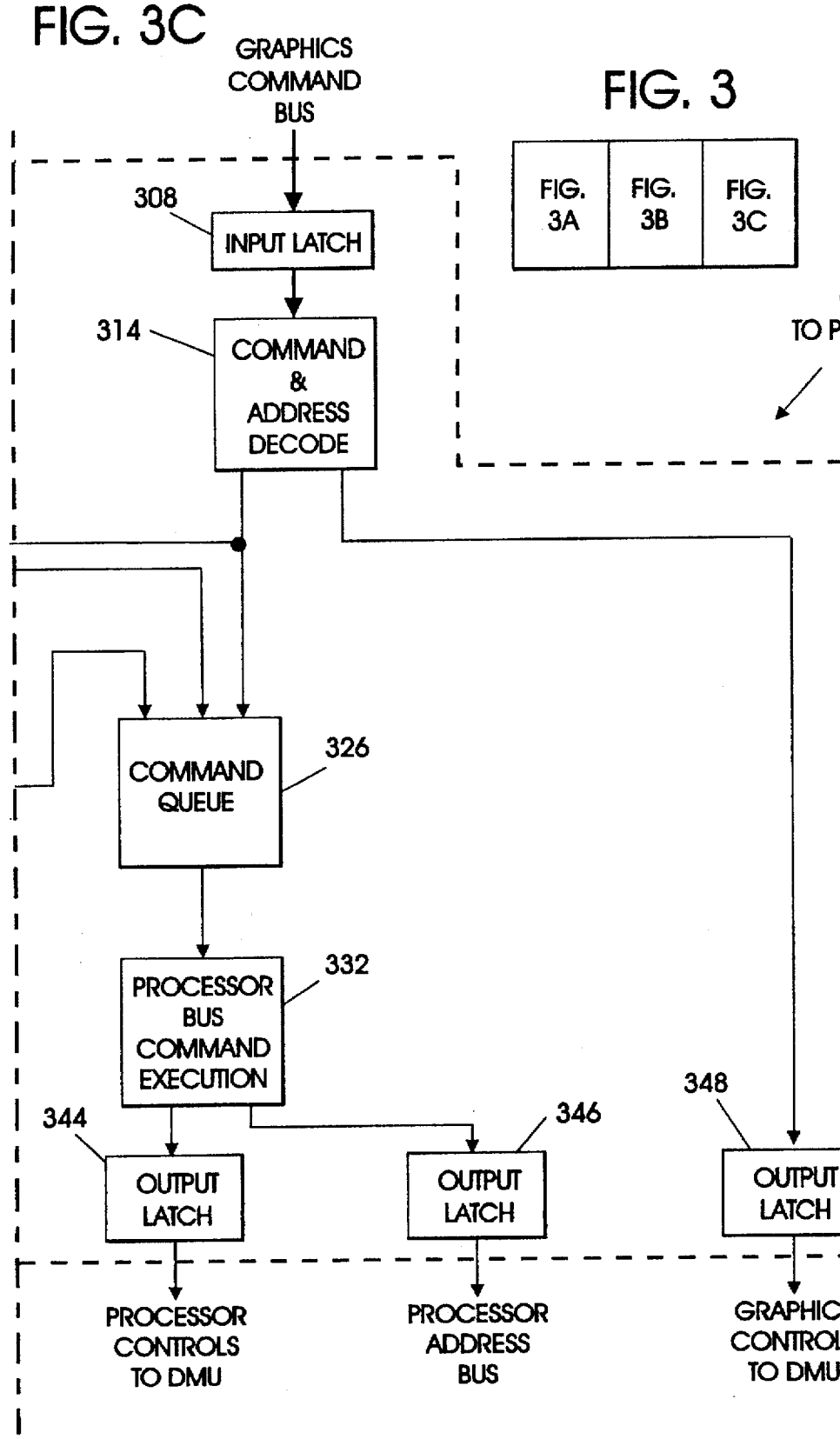

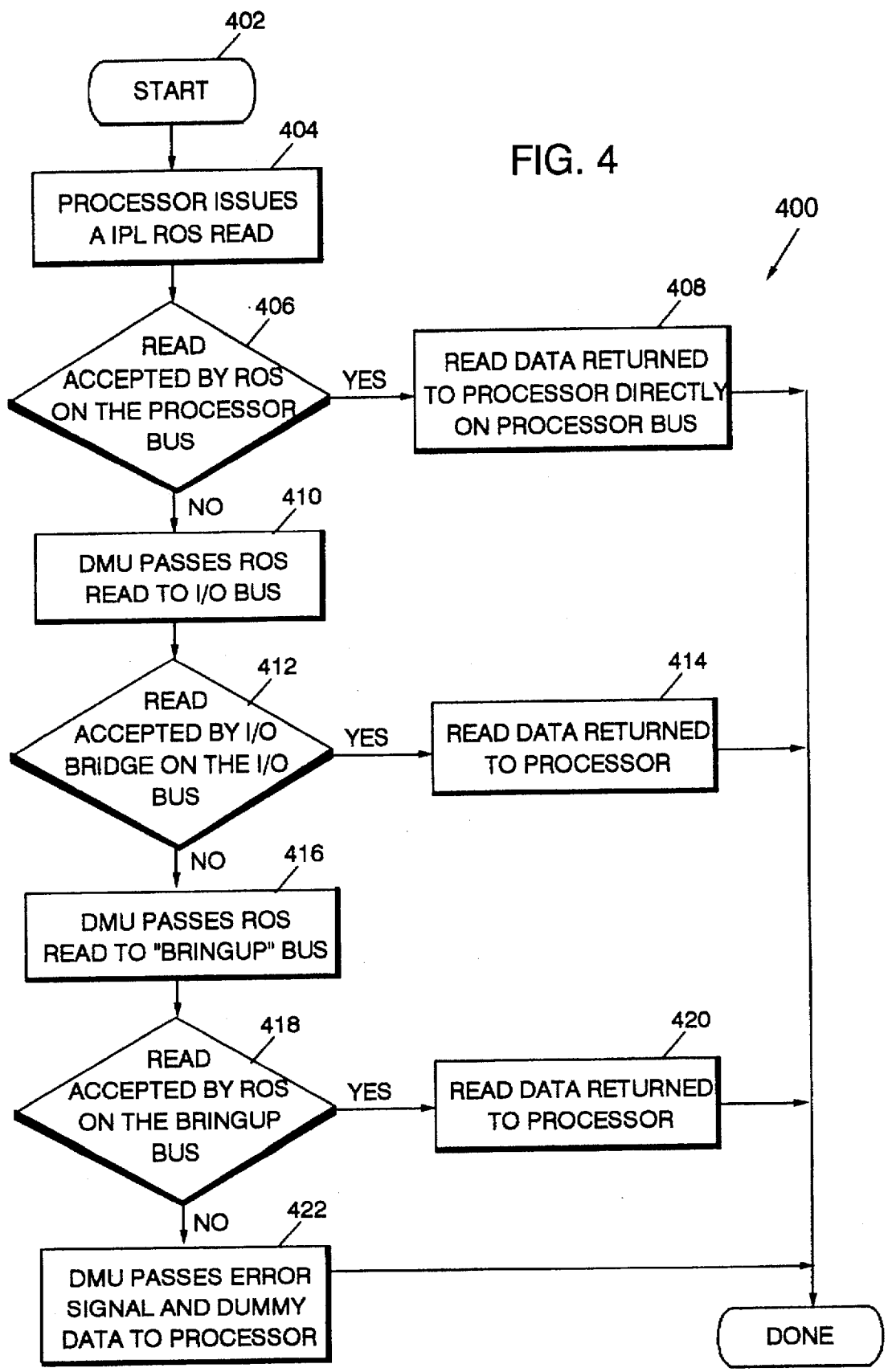

INFORMATION HANDLING SYSTEM INCLUDING EFFICIENT POWER ON INITIALIZATION

BACKGROUND OF THE INVENTION

1. Field of the Invention

The present invention relates to information handling systems, and more particularly to information handling systems including alternate means for system initialization.

2. Prior Art

In the prior art there are many techniques for system initialization at power on. In information handling systems, there are many conditions stored in latches which represent the condition of the system. To avoid ambiguities and errors, these latches must be set to a predetermined condition at the time of power on or system initialization.

In prior art systems, an architected address is established where system initialization routine and supporting data are stored. When an initialization command or power on occurs, the processor reads the routine and data from the architected address to perform the system initialization.

Prior art systems which have a single source for initial program load information and routines lack flexibility.

Examples of prior art initialization systems run from the somewhat simple single processor personal computer system which calls an initialization routine from an architected location, such as from a read-only storage, and data from a predetermined storage location where the data may be stored either as a result of programming a read-only memory chip to more complex systems where IPL data is loaded from a disk.

SUMMARY OF THE INVENTION

Therefore, it is an object of the present invention to increase the flexibility of options for system initialization employing an initialization routine which first looks to reading initialization data from devices attached to a processor bus, if no response, attempting to read initialization data from devices attached to an I/O bus under the control of a bus isolation unit, and if no response, reading system initialization data from a system initialization storage attached to the bus isolation unit.

Accordingly, an information handling system includes one or more processing units, a data management unit, connected to the processor data bus, to a memory system, and to a I/O bus, an address management unit, connected to the processor address bus, to the memory system, to an I/O bus, and to a system initialization storage device, storing an initialization routine and data, wherein system initialization includes, in response to an Initial Program Load Read command issued by a processor, the steps of returning initialization data to the processor if the IPL read is accepted (IPL data available) by a device attached to the processor bus; if no device attached to the processor bus responds with IPL data, passing the read IPL command to the I/O bus under control of the data management unit; if the read command is accepted by an I/O controller attached to the I/O bus, returning initialization data to the processor; if no I/O controller accepts the IPL read command, passing the read command to the system initialization storage device, under the control of the data management unit; and returning initialization data to the processor.

It is an advantage of the present invention that system initialization in a complex multiprocessor system having a bus isolation unit to enhance performance of processors by isolating a processor bus from a lower speed I/O bus by including a multiple tiered system initialization routine which first attempts to access initialization data from devices attached to the processor bus, if not available, attempting to access initialization data from devices attached to the I/O bus, and if not available, reading the initialization data from a system initialization data storage device under the control of the bus isolation unit.

It is another advantage of the present invention that system initialization data can be stored on a device attached to either the processor bus, the I/O bus, or to a low cost I/O architecture independent attachment to a bus isolation unit.

Other features and advantages of the present invention will become apparent in the following detailed description of the preferred embodiment of the invention taken in conjunction with the accompanying drawing.

BRIEF DESCRIPTION OF THE DRAWING

FIGS. 3A, 3B, 3C are a block diagram of an address management unit in accordance with the present invention.

FIG. 4 is a flow chart showing the system initialization method in accordance with the present invention.

DETAILED DESCRIPTION OF A PREFERRED EMBODIMENT OF THE INVENTION

Figure 1:
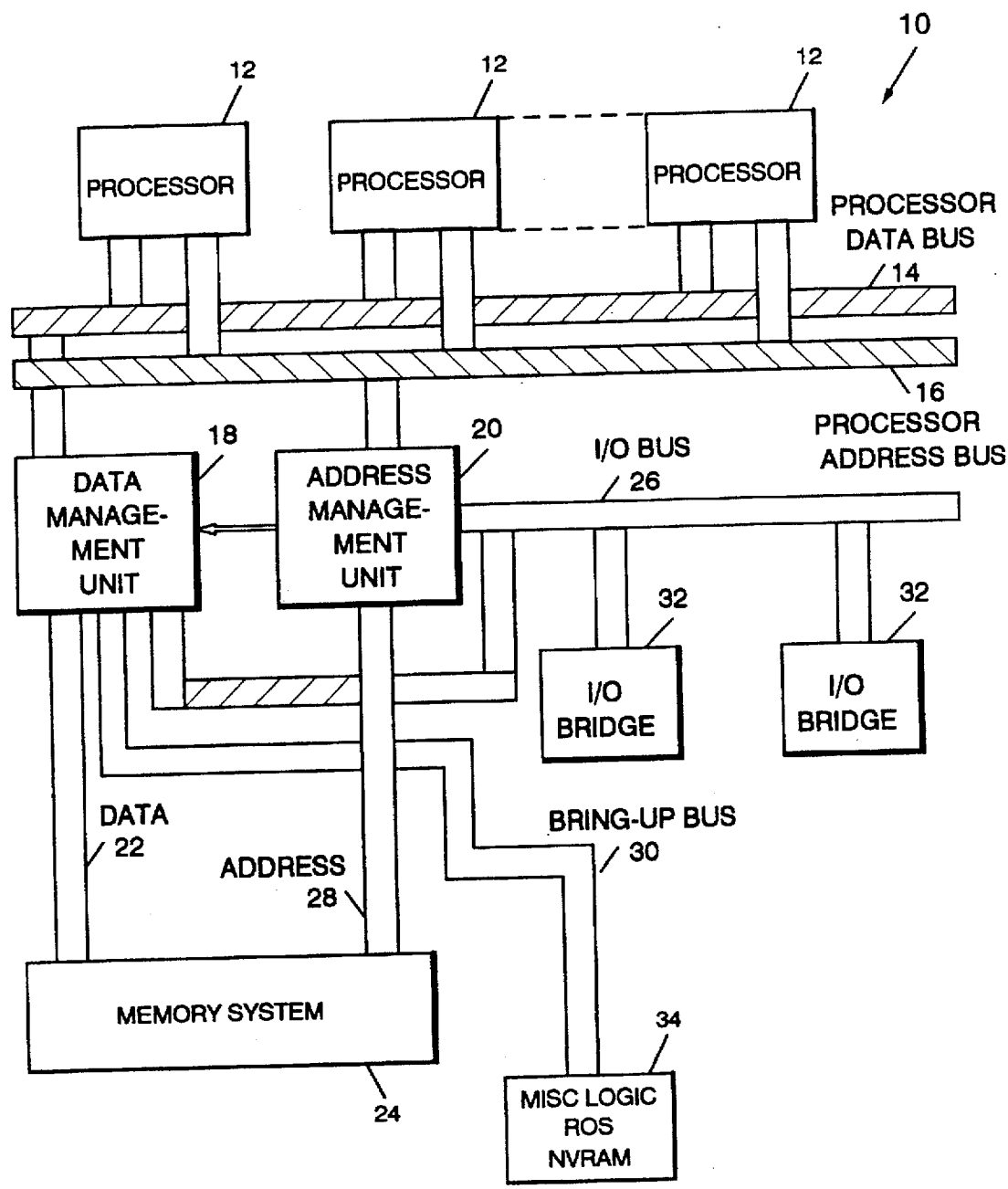
FIG. 1 is a block diagram of an information handling system implementing the present invention.

Referring now to FIG. 1, an information handling system implementing the present invention will be described.

An information handling system 10 includes one or more processing units 12, each having data outputs connected to a processor data bus 14 and having address outputs connected to a processor address bus 16. A data management unit (DMU) 18 is connected to processor data bus 14 and an address management unit (AMU) 20 is connected to processor address bus 16. DMU 18 and AMU 20 may be combined in a single bus isolation unit. Data management unit 18 is connected by memory data bus 22 to memory system 24 and by I/O bus 26 to I/O bridges 32. Address management unit 20 is connected to address lines 28 of memory system 24, to I/O bus 26 and to a bring up bus 30. I/O bus 26 connects between data and address management units 18, 20 and I/O controllers 32. Bring up bus 30 connects data management unit 18 to a bring up routine storage device 34, which may be implemented as a Read Only Store or a nonvolatile RAM.

Each of the units identified above are well known in the art and will not be described in greater detail herein except for data management unit 18 and address management unit 20.

Figure 2A:
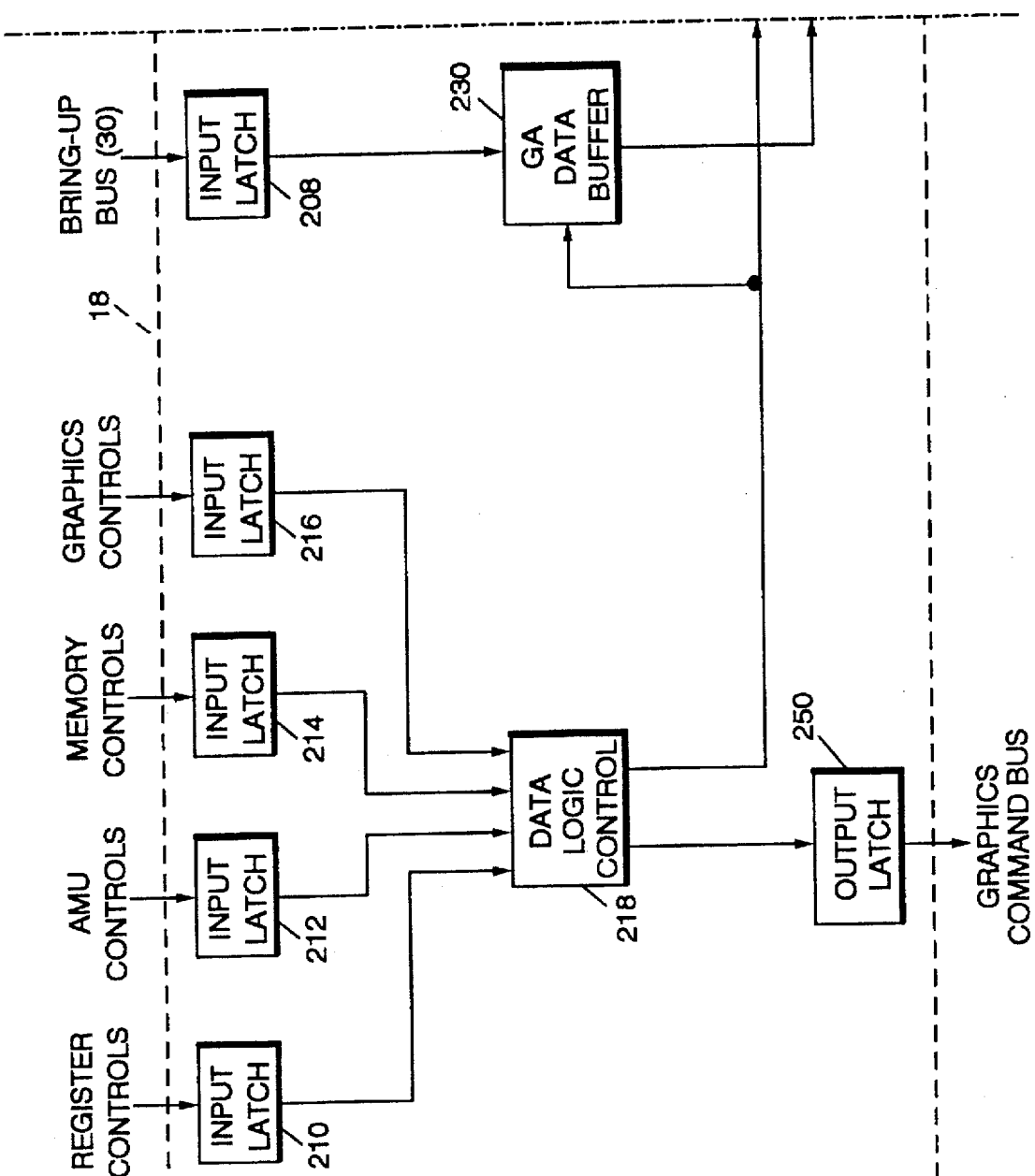
FIGS. 2A, 2B, 2C are a block diagram of a data management unit in accordance with the present invention.
Figure 2:
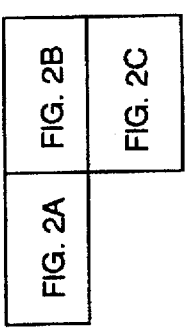
Figure 2C:
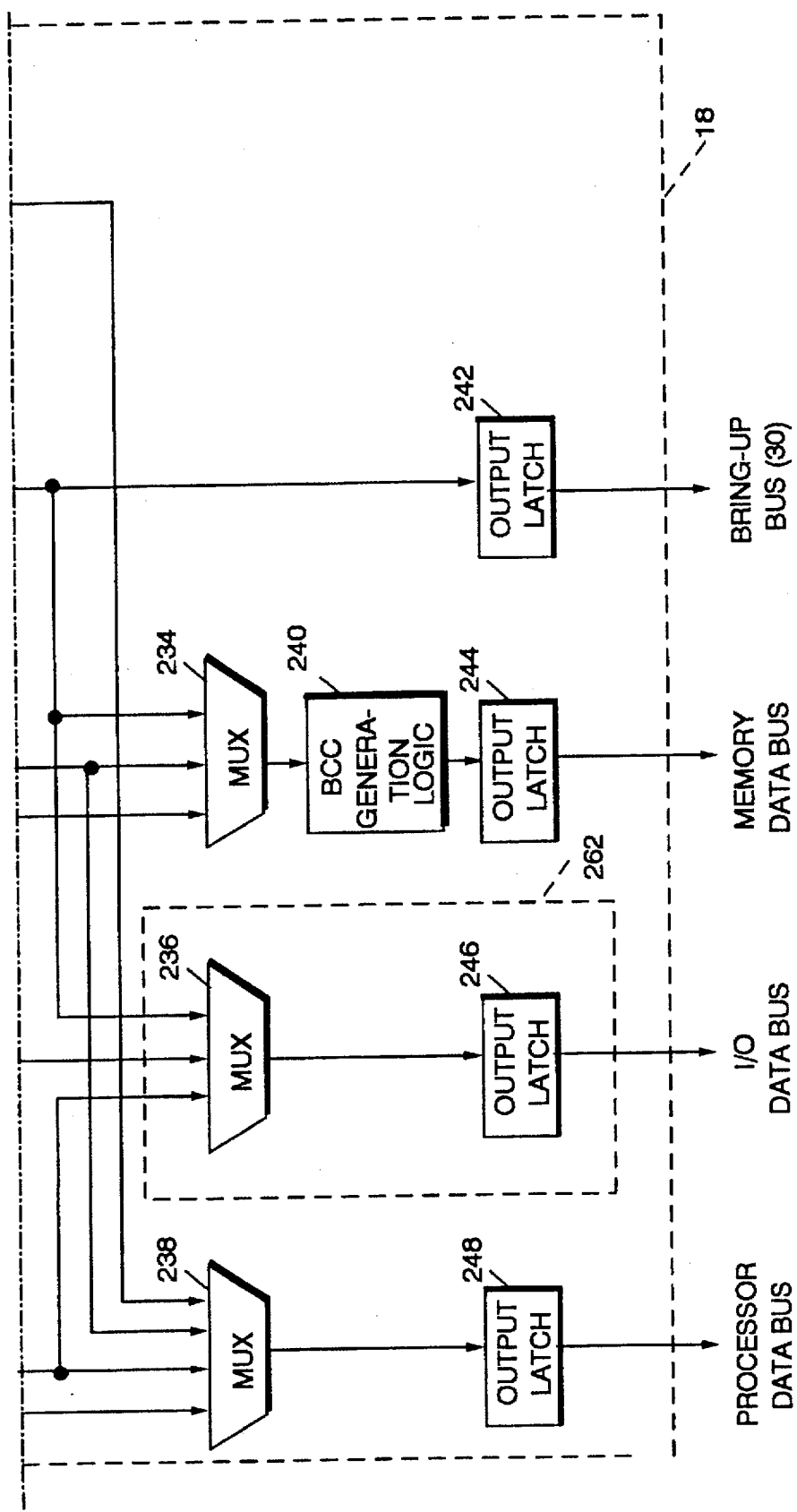

Referring now to FIGS. 2A, 2B, 2C, data management unit 18 will be further described.

Data management unit 18 responds to inputs from a number of buses, such as the processor data bus 14, the memory data bus 22, the I/O data bus 26, and a number of control signals generated by address management unit 20.

All of the input signals to data management unit 18 are latched in input latches as follows:

The processor data bus signals are latched at input latches 202, I/O data signals are latched at input latches 204, memory data signals are latched at input latches 206, signals from bring up bus are latched at input latches 208.

The control signals from the address management unit 20 are latched as follows:

Internal register controls are stored in input latches 210, processor controls are stored in input latches 212, memory controls are stored in input latches 214, and graphics controls are stored in input latches 216. The outputs of the control latches 210, 212, 214, and 216, inclusive, are input to data control logic 218 which provides control signals for gating data through data management unit 18. Additionally, data control logic 218 also provides an output to output latches 250 which represent graphics commands which are then transmitted to a graphics command bus in AMU 20.

The outputs of processor data bus latches 202 are connected to inputs of processor bus data buffers 222 and internal registers 220. The outputs of the processor data bus buffer 222 are connected to output latches 242 and to multiplexors 234 and 236. Data is gated out of buffers 222 under the control of data control logic 218. Internal registers 220 have outputs connected to inputs of multiplexor 238. Again, as indicated above, the outputs of internal registers 220 are controlled by data control logic 218.

Outputs of I/O data latches 204 are connected to inputs of I/O data buffer 224 and graphics control logic and buffers 226. Outputs of I/O data buffers 224 are connected as inputs to multiplexor 234 and 238. Outputs of graphics control logic and buffers 226 are connected to multiplexors 234 and 236. Memory data bus input latches 206 have outputs connected to error correction code (ECC) logic 232. Outputs of ECC logic 232 are connected to memory data buffers 228 and to inputs of graphics control logic and buffers 226. Outputs of memory data buffers 228 are connected to multiplexors 236 and 238.

Bring up bus input latches 208 have outputs connected to data buffer 230 which in turn has outputs connected to multiplexor 238.

As previously indicated, gating of data from registers and buffers 220, 222, 224, 226, 228, and 230 is controlled by data control logic 218. Multiplexors 234, and 236 each have three inputs and multiplexor 238 has four inputs, as controlled by data control logic 218, provide an output representing inputs from one of the registers or buffers 220, 222, 224, 226, 228, or 230 to the respective outputs of the multiplexors 234, 236, or 238.

More specifically, the output of multiplexor 234 is connected to ECC generation logic 240 which generates an error correction code for data to be transmitted to memory system 24 (see FIG. 1). The output of ECC generation latch 240 is connected to output latches 244 which in turn are connected to memory data bus 22. The output of multiplexor 236 is connected to output latches 246 which have outputs connected to I/O data bus 26.

Multiplexor 238 has outputs connected to output latches 248 which have outputs connected to the processor data bus 14.

The circuits and logic contained in blocks 260 and 262 which control and pass data for the I/O data bus 26 are clocked asynchronously to the processor data bus 14. A separate clock (not shown) is used to drive the I/O data on bus 26 at a clock speed which is neither synchronous to nor necessarily arithmetically related to the speed of the processor clock on processor bus 14. For example, if a processor bus clock rate is 100 Mhz, it is possible that the I/O data bus clock speed might be 32 Mhz, for example.

By isolating the processor clock from the I/O data clock through the use of the data management unit 18, transactions between processors and the data management unit may be conducted at processor speed without being slowed down by I/O requests running at a lower speed as in the prior art.

Figure 3A:
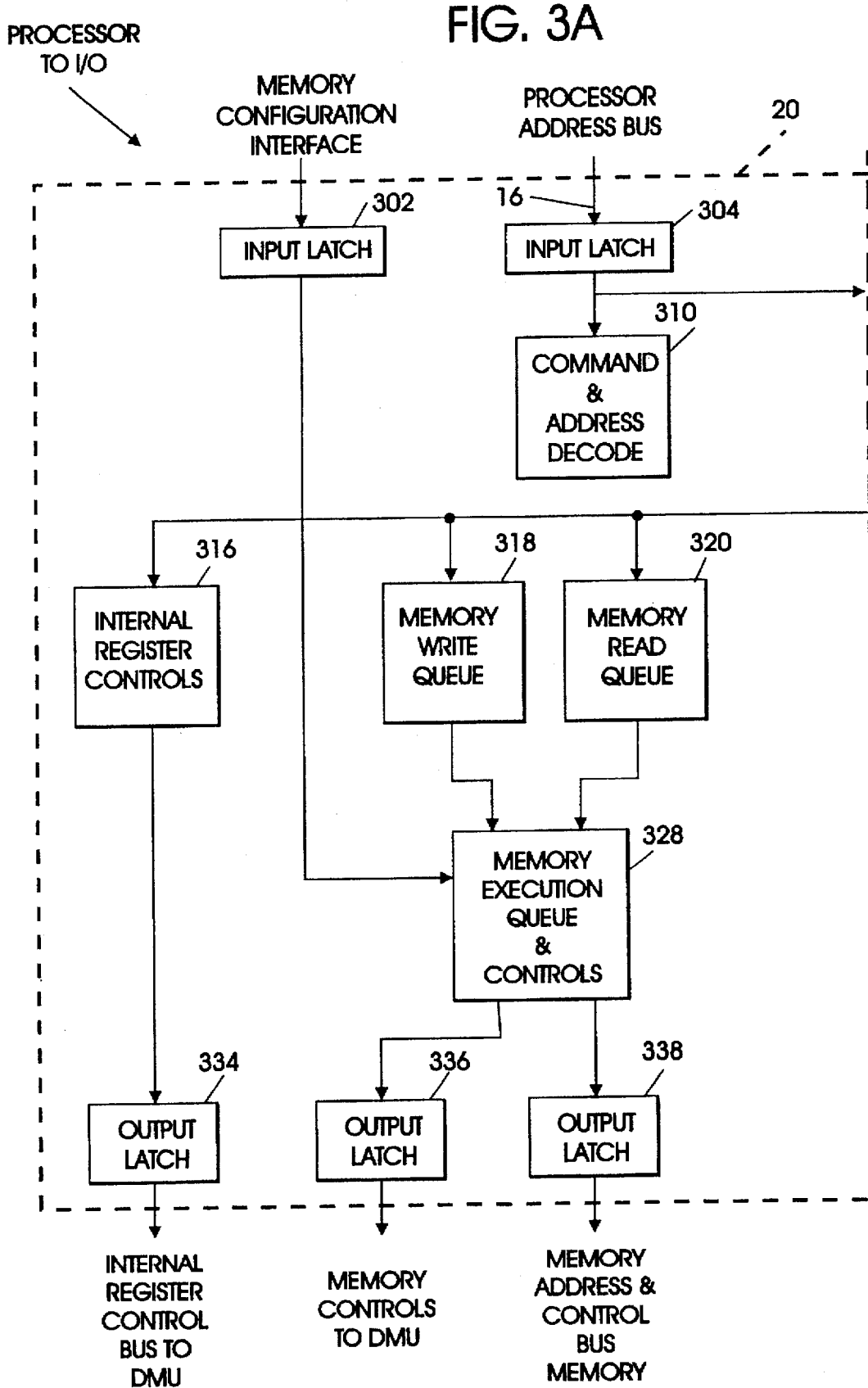
Figure 3B:
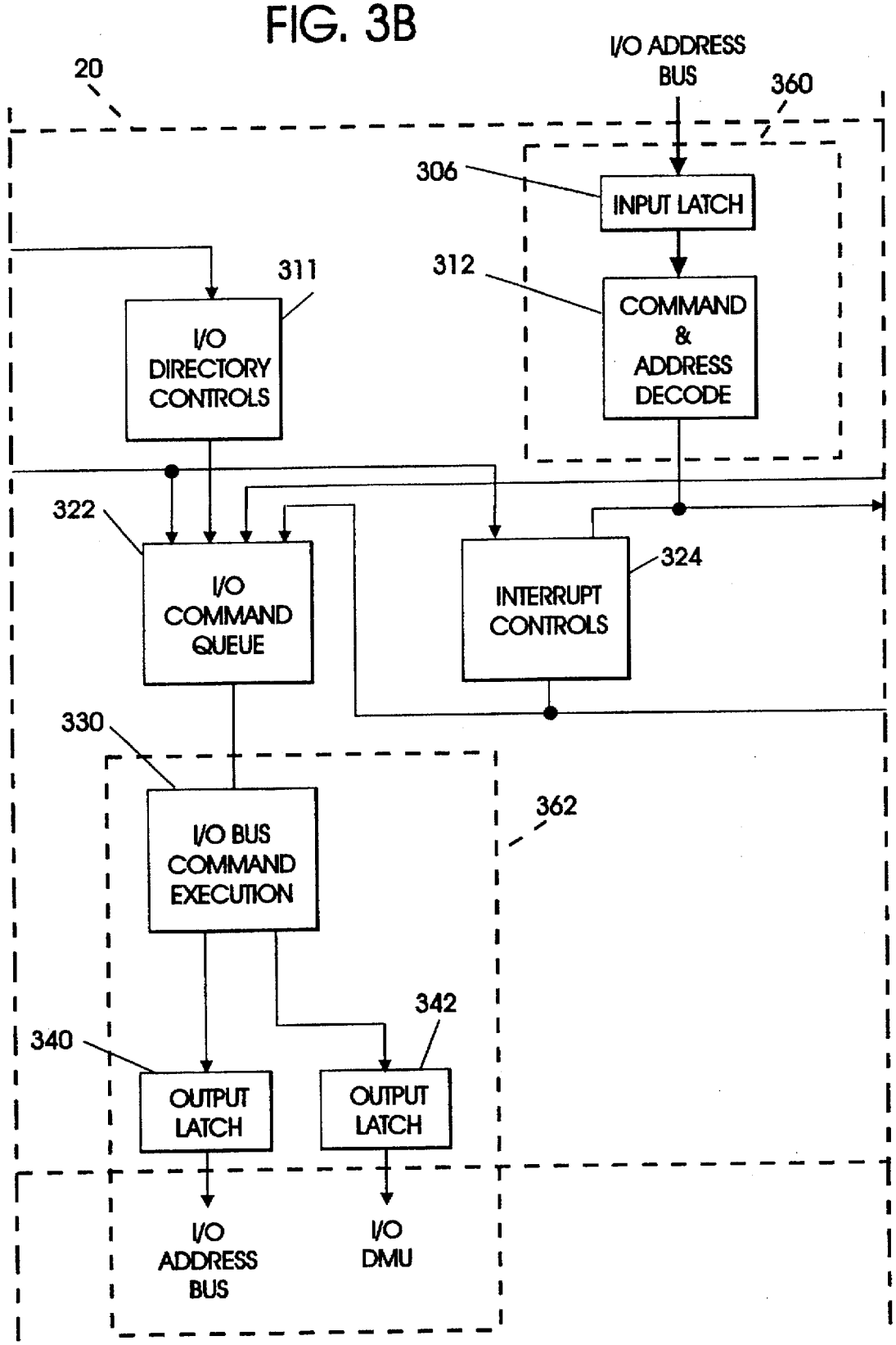

Referring now to FIGS. 3A, 3B, 3C, the address management unit in accordance with the present invention will be further described.

The following inputs to address management unit 20 are latched by input latches as follows:

Memory configuration interface signals are connected to input latch 302, processor address bus signals from processor address bus 16 are latched in input latches 304, I/O address signals are latched in input latches 306, and graphics command bus signals are latches in input latches 308. Outputs of input latches 302 are connected to memory execution queue and controls logic 328. Outputs from processor address bus latches 304 are connected to command and address decode logic 310 and to I/O directory control logic 311. Outputs of command and address decode logic 310 are connected as inputs to internal register controls 316, memory write queue 318, memory read queue 320, processor to I/O command queue 322, and interrupt controls 324. An output of I/O directory control logic 311 is connected to processor to I/O command queue 322.

I/O address input latches 306 have outputs connected to command and address decode logic 312. The outputs of command and address decode logic 312 are connected to inputs to interrupt control logic 324 and to I/O to processor command queue logic 326. Graphics command input latches 308 has outputs connected to command and address decode logic 314 which in turn has a first output connected to output latch 348 which generates an output signal to data management unit 18 for the graphics controls. Second outputs of command and address decode logic 314 are connected to processor to I/O command queue logic 322 and I/O to processor command queue logic 326.

Processor to I/O command queue logic 322 and I/O to processor command queue logic 326 each have a third input which is an output from interrupt control logic 324.

Outputs of internal register control logic 316 are connected to inputs of output latches 334 which provide the internal register control signal to data management unit 18. Outputs of memory write queue logic 318 and memory read queue logic 320 are connected to memory execution queue and control logic 328. Also, the outputs from input latch 302 from memory configuration interface are connected to memory execution queue and control logic 328. A first output of memory execution queue in control logic 328 is connected to output latches 336 which provide memory control signals to data management unit 18. Second outputs from memory execution queue and control logic 328 are connected to output latches 338 which provide memory address and control signals to memory 24 (see FIG. 1). Outputs of processor to I/O command queue logic 322 are connected to inputs to I/O command execution logic 330. A first output from I/O command execution logic 330 is latched in latches 340 for transmission to the I/O address bus 26. A second set of outputs from I/O command execution logic 330 is latched by latches 342 and represents the I/O control signals to be transmitted to data management unit 18. Outputs of I/O to processor command queue logic 326 are connected to processor command execution logic 332 which has a first set of outputs connected to output 344 which represent the processor controls to be transmitted to the data management unit 18 and a second set of outputs latched in output latches 346 which has outputs connected to the processor address bus 16.

As indicated above with respect to FIG. 2, the I/O bus 26 may operate at a frequency which is different from an asynchronous with the processor data and address buses 14 and 16. The logic included in blocks 360 and 362 related to the I/O address, commands and data as shown in FIG. 3 are operated under the control of the I/O clock referred to above with respect to FIG. 2 which is independent from the processor bus clock and runs asynchronous with respect to the processor bus clock. Thus, address, data, control signals and interrupts on the I/O bus 26 are handled under the control of data management unit 18 and address management unit 20 in such a manner so as to optimize the performance of processors 12 directly connected to processor data bus 14 and processor address bus 16.

Referring now to FIG. 4, the system initialization routine according to the present invention will be described.

System initialization routine 400 begins 402 when a processor issues an IPL ROS read command 404. If the read is accepted 406 by read-only storage attached to the processor bus, the read data is returned 408 to the processor directly on the processor bus, and the initialization read is completed.

If no device attached to the system bus accepts the IPL read command, the data management unit 18 passes 410 the IPL read command to the I/O bus 26.

If the IPL read is accepted 412 by an I/O controller attached to I/O bus 26, the read data is returned 414 to the processor, and the initialization read is completed.

If the read is not accepted by a device on I/O bus 26, data management unit 18 passes 416 the initial program load read to a system initialization storage device 34. If the IPL read is accepted 418 by system initialization storage device 34, the read data is returned 420 to the processor, and the initialization read is completed. If the IPL read command is not accepted by the system initialization storage device 34, data management unit 18 passes 422 an error signal and dummy data to the processor indicating an error in the system initialization.

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. An information handling system comprising:

one or more processing units;

a bus isolation unit, connected to a processor bus, to a memory system, to a I/O bus; and means for controlling system initialization, comprising means for storing an initialization routine and data;

in response to an Initial Program Load Read (IPL) command issued by a processor, first means for returning initialization data to the processor if the IPL read command is accepted by a device attached to the processor bus;

if no device attached to the processor bus responds with IPL data, means for passing the IPL read command to the I/O bus under control of the bus isolation unit;

if the read command is accepted by an I/O controller attached to the I/O bus, second means for returning initialization data to the processor;

if no I/O controller accepts the IPL read command, means for passing the IPL read command to the means for storing system initialization data, under the control of the bus isolation unit; and third means for returning initialization data from the means for storing an initialization routine and data to the processor.

2. A method for initializing an information handling system including one or more processing units, a bus isolation unit, connected to a processor bus, to a memory system, to a I/O bus, comprising the steps of:

storing an initialization routine and data in a system initialization storage means;

in response to an Initial Program Load Read (IPL) command issued by a processor, returning initialization data to the processor if the IPL read command is accepted by a device attached to the processor bus;

if no device attached to the processor bus responds with IPL data, passing the IPL read command to the I/O bus under control of the bus isolation unit;

if the read command is accepted by an I/O controller attached to the I/O bus, returning initialization data to the processor;

if no I/O controller accepts the IPL read command, passing the IPL read command to the system initialization storing means, under the control of the bus isolation unit; and returning initialization data from the means for storing an initialization routine and data to the processor.

* * * * *